Nov. 1, 1966  W. R. WHITNEY  3,281,900
EXTRUSION APPARATUS

Filed Aug. 13, 1964  3 Sheets-Sheet 1

INVENTOR.
W. R. WHITNEY
BY
*Young & Quigg*
ATTORNEYS

INVENTOR.
W. R. WHITNEY
BY
ATTORNEYS

INVENTOR.
W. R. WHITNEY
BY
ATTORNEYS

United States Patent Office 3,281,900
Patented Nov. 1, 1966

3,281,900
EXTRUSION APPARATUS
William R. Whitney, Bartlesville, Okla., assignor to Phillips Petroleum Company, a corporation of Delaware
Filed Aug. 13, 1964, Ser. No. 389,392
6 Claims. (Cl. 18—30)

This invention relates to extrusion apparatus. In one aspect, the invention relates to flow control means for preparing a plastic mass for extrusion. In another aspect, the invention relates to improved extrusion apparatus.

Extrusion is a frequently used technique for producing elongated profile shapes. It is often used, for example, in the production of pipe or tubing or other cross sectional configurations from thermoplastic materials such as nylon, polyvinyl acetate, polyvinyl chloride and polyolefins, for example, polyethylene, polypropylene, and copolymers of these or other polyolefins or mixtures of two or more materials. The extrusion procedure includes plasticizing, forming and setting.

Dynamic extrusion is a process wherein a plastic mass is forced, by means of a reciprocating piston, through a cool zone, then into a heated zone to melt the plastic mass, then to a mixing section and a long land die, in which the shape takes form and is cooled to a crystalline or near crystalline state prior to leaving the die. In the melt phase many polymers forming the plastic mass are significantly compressible. This raises a problem in that the melt acts somewhat like a spring so that on the piston back stroke, the powder or granules or pellets of polymer are forced to follow the piston for some distance, thus reducing the capacity of the new charge and also wasting energy through loss of entropy. This seesaw motion of the pellets also is erosive to the interior surfaces of the extrusion machine and die.

An object of my invention is to produce accurately sized and shaped and smooth surfaced extruded products.

Another object of my invention is to provide homogeneous plasticized plastic masses for extrusion.

Another object of my invention is to control the flow of the pastic mass in an extruder.

Another object of my invention is to provide improved extrusion apparatus.

Other aspects, objects and the advantages of my invention are apparent in the written description, the drawing and the claims.

According to my invention, there is provided apparatus for controlling the flow of a plastic mass for extrusion by increasing the flow channel of the extrusion machine through the zones where the polymer is still granular at such a rate that the polymer bridges in the channel instead of backflowing when the piston moves back, thus providing a "check valve" effect which improves efficiency and reduces erosion of the flow passages. Apparatus according to my invention comprises a body having a generally conical opening therein and a flow control mandrel in the opening, the mandrel comprising a generally conical member which has a plurality of channels thereon separated by a plurality of lands, the channels providing a passageway between the body and the mandrel which passageway increases in cross sectional area in the direction of flow of the plastic mass therethrough, and the lands conforming generally to the shape of the opening in the body thereby serving to resist distortion of the mandrel and to maintain the mandrel centrally positioned. The channels can be ones which gradually increase in cross sectional area as they proceed from the inlet to the outlet of the flow control section or the channels can be of generally constant cross section or even decreasing cross section, with the number of channels increasing in the direction of flow past the mandrel. That is to say, as the surface of the mandrel is traversed from the inlet to the outlet, some of the channels extend throughout its length while others begin the point or points along the surface and extend to the exit end whereby the total cross sectional passageway area is increased by increasing the number of channels rather than increasing the cross sectional area of a given channel.

The chanel are separated by a plurality of lands which are designed and constructed to be in contact with the inner surface of the conical opening in the body or, preferably, very closely spaced thereto to provide for expansion and contraction. These lands serve to prevent substantial movement of the mandrel in the opening and also, together with the channels, provide a large contacting surface between the mandrel and the plastic mass for efficient heat transfer therebetween for improving the heat distribution within the plastic mass.

Further according to my invention, the channels in the flow control mandrel are formed as fluted sections. The fluted sections either increase in cross sectional area in the direction of flow along the mandrel or the number of fluted sections is increased in the direction of flow thereby increasing the total cross sectional area between the mandrel and the body in the direction of flow of the plastic mass.

Further according to my invention, there is provided extrusion apparatus comprising a long land die, a reciprocating plunger to force the plastic melt into the die, means to provide a smoothly decreasing temperature gradient along the die to solidify the melt prior to removal from the die, and flow control means between the plunger and the die.

Further according to my invention, there is provided a dynamic extrusion apparatus comprising a long land die, a reciprocating plunger to force the plastic melt into the die, means to provide a smoothly decreasing temperature gradient along the die to solidify the melt prior to removal from the die, and plasticizing and flow control means between the plunger and the die for preparing a plastic mass for extrusion and controlling the flow thereof.

In the drawing, FIGURE 1 is an elevation, partly diagrammatic, of an extruder embodying the present invention.

Figure 1:
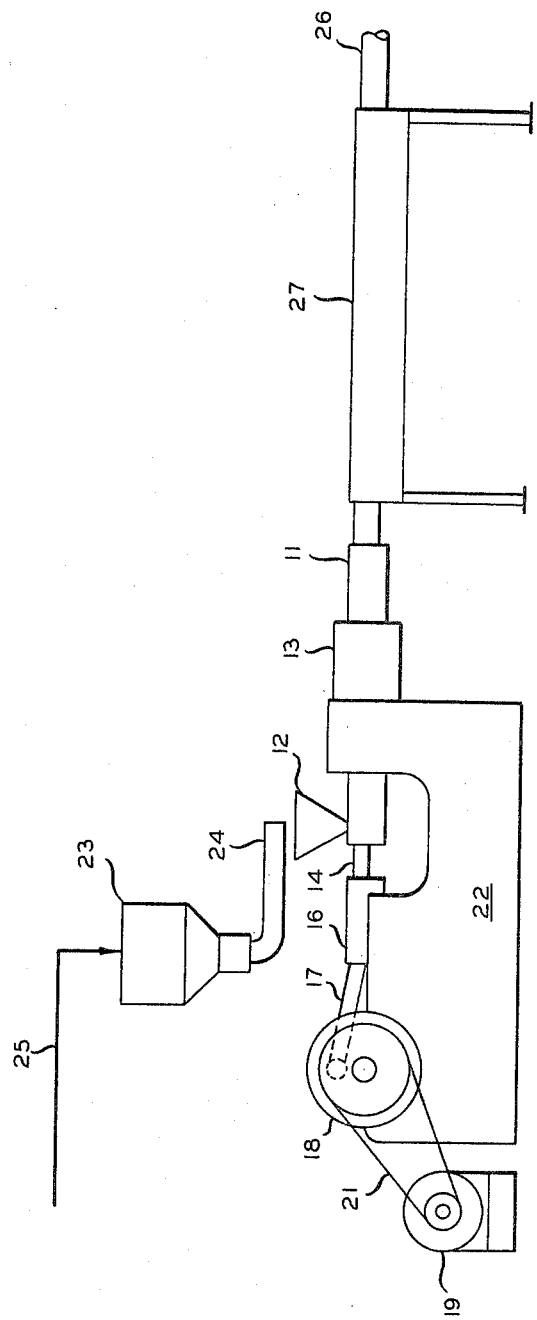

Referring to FIGURE 1, the extrusion apparatus comprises a long land die 11, a feed hopper 12, a plasticizing and flow control means 13, a plunger 14 attached to cross head 16, a connecting rod 17, and a fly wheel 18, driven by motor 19 by means of belt 21. The entire extrusion apparatus is supported on a base 22. A supply hopper 23 and a proportional feeder 24 supply pellets of extrudable thermoplastic to feed hopper 12, the plastic being supplied to hopper 23 from a suitable source, such as indicated diagrammatically by line 25. The extrudate is illustrated by the elongated portion 26. The diagrammatic representation 27 represents other suitable apparatus such as water coolers, brakes, supports, etc., which are supplied as desired.

Figure 2:
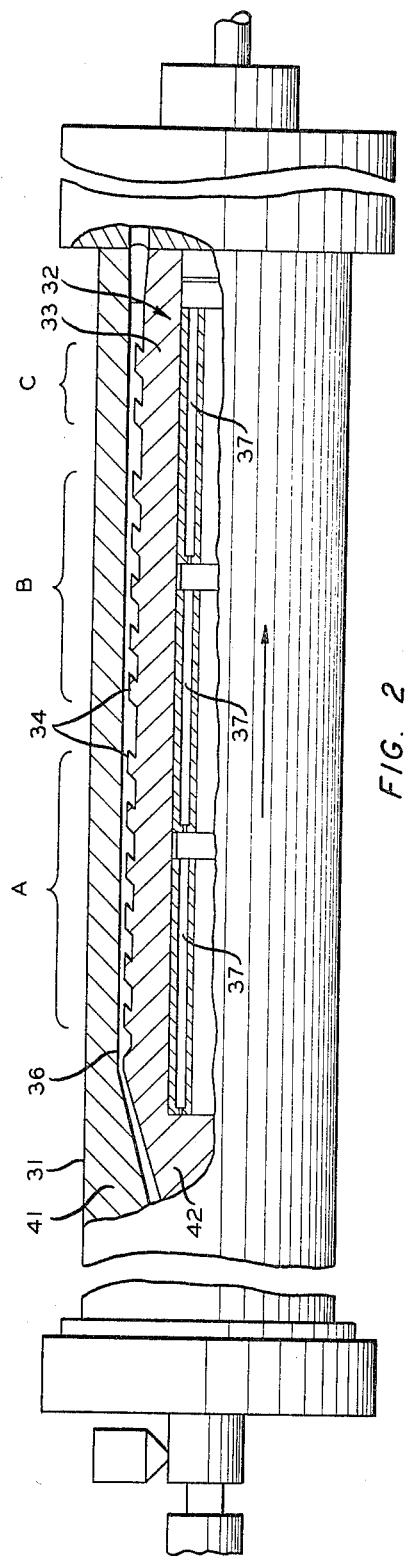
FIGURE 2 is a cross section of flow control and plasticizing means.

As illustrated in FIGURE 2, the plasticizing means comprises a body 31 and a dispersion mandrel 32. Dispersion mandrel 32 comprises a central core 33 and a plurality of teeth 34. It is seen that core 33 and body 31, together, define an annular passage 36. Teeth 34 extend outwardly from core 33 to annular passage 36. Teeth 34 are inclined in the direction of flow through the apparatus, the flow being from left to right, in the direction of the arrow, as illustrated in FIGURE 2. There are illustrated in FIGURE 2 a plurality of heaters, such as electrical cartridge heaters 37, in the interior of core 33. Heaters can also be provided on the exterior of body 31 or embedded in body 31. Other heating means such as conduits for circulating heated fluids, or means for dielectric heating, etc., can be utilized.

The flow of the plastic mass through that portion of the apparatus illustrated in FIGURE 2 is from left to right in the direction of the arrow.

Figure 3:
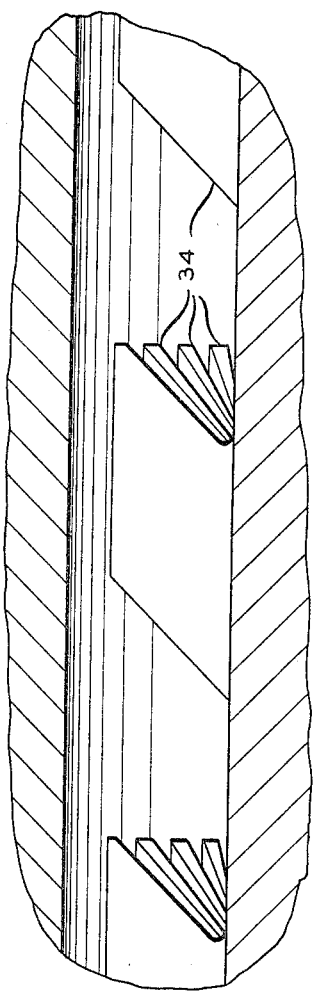
FIGURE 3 is a detail of the teeth in the annular passage of the plasticizing means of FIGURE 2.
Figure 4:
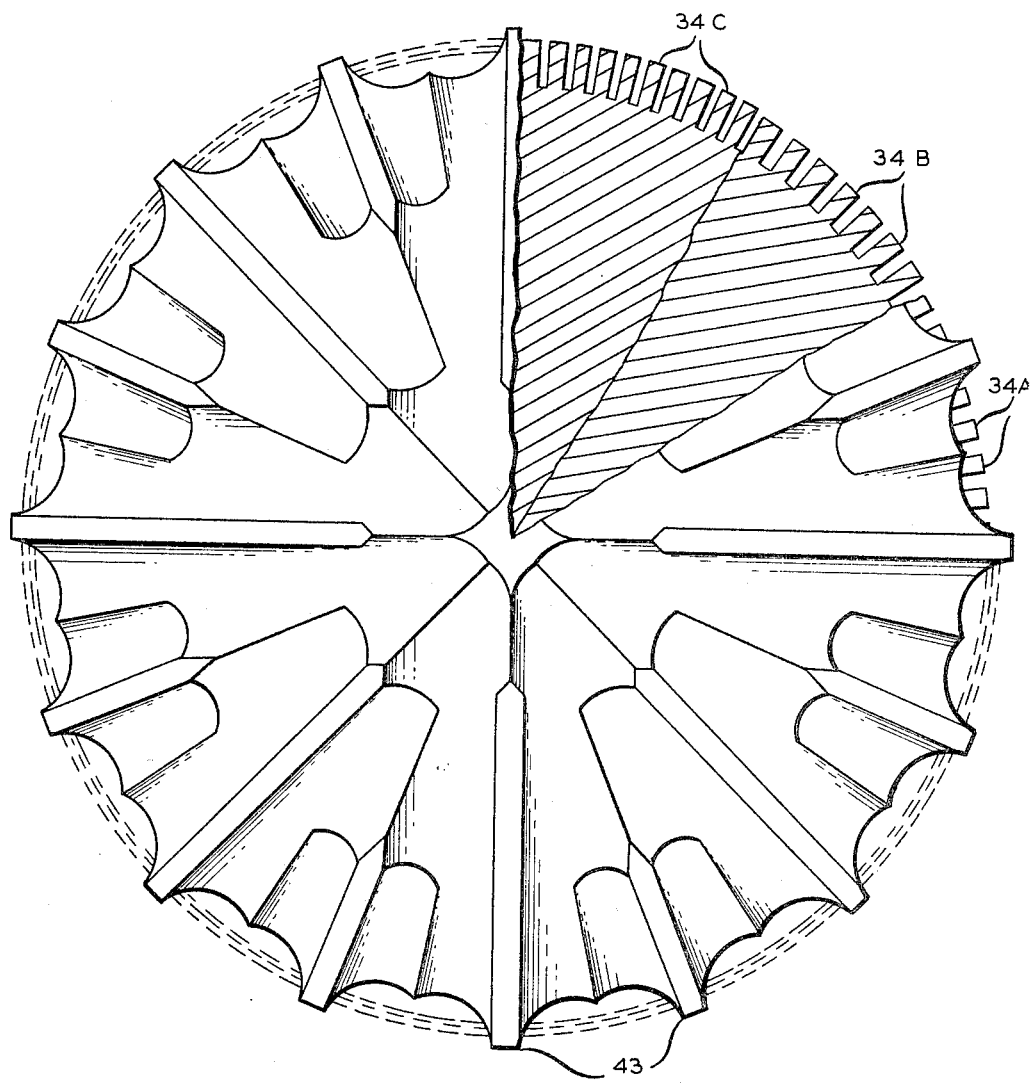
FIGURE 4 shows a flow control means for use in and dispersion means in the plasticizing and flow control section of an extrusion apparatus.

The configuration of teeth 34 is also illustrated in FIGURES 3 and 4. As shown in these figures, the teeth are spaced circumferentially around the core 33 and are arranged in rows, the rows being spaced longitudinally along core 33. In the apparatus pictured in FIGURE 2, the rows are arranged in three groups, A, B and C. The spacing between the teeth and the spacing between the outer edges of the teeth and the inner wall of body 31 vary as shown clearly in FIGURE 4. The teeth of the rows of group A, teeth 34A, are spaced farther apart and farther from the wall of body 31 than are the teeth of the rows of group B, teeth 34B, and teeth 34B are in turn spaced farther apart and farther from the wall of body 31 than the teeth of group C, teeth 34C.

The flow control means also are illustrated in FIGURE 2 and FIGURE 4. The flow control means include a portion of body 31 wherein the opening therethrough is tapered to provide a conical portion 41. A generally conical flow control mandrel 42 is positioned in conical portion 41. This mandrel 42 is provided with a fluted surface as can be seen more clearly in FIGURE 4. This fluted surface provides a plurality of rib-like portions or lands 43 which are spaced very closely to the inner wall of conical portion 41, and prevent substantial movement of mandrel 42, thus keeping it substantially centered in conical portion 41. The number of fluted portions increases toward the large or exit end, resulting in a gradual increase in total cross section in the direction of flow through the flow control section. That is, although as indicated in the cross section of FIGURE 2 it appears that the cross sectional area decreases in the direction of flow therethrough, the increase in the number of fluted sections which can be seen in FIGURE 4 is sufficient that there is an increase in cross section in the direction of flow. This increase in cross section prevents undesirable back flow of the plastic material therethrough on the back stroke of the plunger 14.

It will be recognized that all of the drawings are somewhat schematic in nature and the details of construction unnecessary to a complete understanding of the invention have been eliminated for clarity of illustration. For example, in FIGURE 2, the mandrel 32 and/or body 33 can be made in two or more parts, attached together by threaded sections or bolts or other conventional fastening means to facilitate construction and assembly. Any suitable material can be utilized, such as stainless steel. The flow control apparatus and the entire extrusion apparatus are suitable for extruding various sections such as pipes, rods, and irregular cross sections, as well as for coating wires, cables, tubes, etc.

In dynamic extrusion, the length of a long land die generally is in the range of 10 to 100 times the thickness of the profile, preferably in the range of 20 to 60 times. Means to orient the extrudate such as a sizing horn and means to draw the extrudate over the horn can be used therewith. Various forms of plunger means can be used, such as a two-part plunger mecahnism including a first plunger, means to reciprocate it, and a second plunger actuated by a lost motion connection with the means to reciprocate the first plunger.

Reasonable variation and modification are possible within the scope of my invention which sets forth apparatus for preparing plastic masses for extrusion and for extruding a thermoplastic material.

I claim:

1. Flow control means for controlling a plastic mass in preparation for extrusion, comprising:

a body having a generally conical opening therein; and
a flow control mandrel in said conical section, said flow control mandrel comprising a generally conical member, said mandrel having a plurality of fluted channels thereon separated by a plurality of lands, said channels providing a passageway between said body and said mandrel, the number of said channels increasing in the direction of flow of said plastic mass whereby said passageway increases in cross sectional area in the direction of flow of said plastic mass therethrough, said lands conforming generally to the shape of said generally conical opening, thereby serving to resist distortion of said mandrel to contain said mandrel centrally positioned in said opening.

2. Flow control means for controlling a plastic mass in preparation for extrusion, comprising:

a body having a generally conical opening therein; and
a flow control mandrel in said conical section, said flow control mandrel comprising a generally conical member, said mandrel having a plurality of fluted, generally constant cross section channels thereon separated by a plurality of lands, the number of said channels on said mandrel increasing in the direction of flow of said plastic mass therethrough, thereby providing a passageway between said body and said mandrel which passageway increases in cross sectional area in the direction of flow of said plastic mass therethrough, said lands conforming generally to the shape of said generally conical opening, thereby serving to resist the distortion of said mandrel to maintain said mandrel centrally positioned in said opening.

3. In a dynamic extrusion apparatus comprising a long land die, a reciprocating plunger to force a plastic melt into said die and means to provide a smoothly decreasing temperature gradient along said die to solidify said melt prior to removal from said die, the improvement which comprises:

flow control means between said plunger and said die for controlling a plastic mass in preparation for extrusion, comprising:

a body having a generally conical opening therein; and
a flow control mandrel in said conical section, said flow control mandrel comprising a generally conical member, said mandrel having a plurality of fluted channels thereon separated by a plurality of lands, said channels providing a passageway between said body and said mandrel, the number of said channels increasing in the direction of flow of said plastic mass whereby said passageway increases in cross sectional area in the direction of flow of said plastic mass therethrough, said lands conforming generally to the shape of said generally conical opening, thereby serving to resist distortion of said mandrel to contain said mandrel centrally positioned in said opening.

4. In a dynamic extrusion apparatus comprising a long land die, a reciprocating plunger to force a plastic melt into said die and means to provide a smoothly decreasing temperature gradient along said die to solidify said melt prior to removal from said die, the improvement which comprises:

flow control means between said plunger and said die for controlling a plastic mass in preparation for extrusion, comprising:

a body having a generally conical opening therein; and
a flow control mandrel in said conical section, said flow control mandrel comprising a generally conical member, said mandrel having a plurality of fluted, generally constant cross section channels thereon separated by a plurality of lands, the number of said channels on said mandrel increasing in the direction of flow of said plastic mass therethrough, thereby providing a passageway between said body and said mandrel which passageway increases in cross sectional area in the direction of flow of said plastic mass therethrough, said lands conforming generally to the shape of said generally conical opening, thereby serving to resist distortion of said mandrel to maintain said mandrel centrally positioned in said opening.

5. In a dynamic extrusion apparatus comprising a long land die, a reciprocating plunger to force a plastic melt into said die and means to provide a smoothly decreasing temperature gradient along said die to solidify said melt prior to removal from said die, the improvement which comprises:

plasticizing and flow control means for preparing a plastic mass for extrusion and controlling the flow thereof, comprising a body having a generally conical opening and an adjacent generally cylindrical opening downstream of said conical opening in the direction of flow of said plastic mass therethrough;

a flow control and dispersion mandrel comprising a flow control section in said conical section and a dispersion section in said generally cylindrical opening;

said flow control section comprising a generally conical member, said flow control section having a plurality of channels thereon, separated by a plurality of lands, said channels providing a passageway between said body and said flow control section, the number of said channels increasing in the direction of flow of said plastic mass whereby said passageway increases in cross sectional area in the direction of flow of said plastic mass therethrough, said lands conforming generally to the shape of said generally conical opening thereby serving to resist distortion of said flow control section to maintain said flow control section centrally positioned in said opening; and said dispersion section comprising a central core forming an annular passage in said generally cylindrical opening between said body and said core, and a plurality of teeth circumferentially spaced on said core and extending outwardly therefrom substantially through said annular passage, each of said teeth being inclined from said core toward said body in the direction of flow of said plastic mass therethrough.

6. In a dynamic extrusion apparatus comprising a long land die, a reciprocating plunger to force a plastic melt into said die and means to provide a smoothly decreasing temperature gradient along said die to solidify said melt prior to removal from said die, the improvement which comprises:

plasticizing and flow control means for preparing a plastic mass for extrusion and controlling the flow thereof, comprising a body having a generally conical opening and an adjacent generally cylindrical opening downstream of said conical opening in the direction of flow of said plastic mass therethrough;

a flow control and dispersion mandrel comprising a flow control section in said conical section and a dispersion section in said generally cylindrical opening;

said flow control section comprising a generally conical member, said flow control section having a plurality of fluted, generally constant cross section channels thereon separated by a plurality of lands, the number of said channels on said flow control section increasing in the direction of flow of said plastic mass therethrough, thereby providing a passageway between said body and said flow control section which passageway increases in cross sectional area in the direction of flow of said plastic mass therethrough, said lands conforming generally to the shape of said generally conical opening, thereby serving to resist distortion of said mandrel to maintain said mandrel centrally positioned in said opening; and said dispersion section comprising a central core forming an annular passage in said generally cylindrical opening between said body and said core, and a plurality of teeth circumferentially spaced on said core and extending outwardly therefrom substantially through said annular passage, each of said teeth being inclined from said core toward said body in the direction of flow of said plastic mass therethrough.

References Cited by the Examiner
UNITED STATES PATENTS

| 2,057,945 | 10/1936 | Gastrow | 18—30 |
| 2,480,838 | 9/1949 | Caron | 18—30 |
| 2,482,243 | 9/1949 | Burnham | 18—30 |
| 2,500,401 | 3/1950 | Cossette | 18—30 |
| 2,740,160 | 4/1956 | McKee et al. | 18—30 |

FOREIGN PATENTS 584,040 10/1958 Italy.

WILLIAM J. STEPHENSON, *Primary Examiner.*